US012758998B2

(12) United States Patent
Shen

(10) Patent No.: US 12,758,998 B2
(45) Date of Patent: Oct. 13, 2026

(54) SPRAY GUN WITH CONVENIENT AND QUICK WATER DISCHARGE

(71) Applicant: CIXI TIAN SHUO INDUSTRY TRADE CO.,LTD, Cixi (CN)

(72) Inventor: Kai Shen, Cixi (CN)

(73) Assignee: CIXI TIAN SHUO INDUSTRY TRADE CO., LTD, Cixi (CN)

( * ) Notice: Subject to any disclaimer, the term of this patent is extended or adjusted under 35 U.S.C. 154(b) by 191 days.

(21) Appl. No.: 18/658,089

(22) Filed: May 8, 2024

(65) Prior Publication Data

US 2025/0345815 A1 Nov. 13, 2025

(51) Int. Cl.
*B05B 9/01* (2006.01)
*B05B 11/01* (2023.01)

(52) U.S. Cl.
CPC ................ *B05B 9/01* (2013.01); *B05B 11/01* (2023.01)

(58) Field of Classification Search
CPC ........... B05B 9/01; B05B 11/01; B05B 11/00; B05B 1/12; B05B 1/16; B05B 1/18; B05B 1/30
See application file for complete search history.

(56) References Cited

U.S. PATENT DOCUMENTS 4,534,512 A * 8/1985 Chow ....................... B05B 9/01 239/394

FOREIGN PATENT DOCUMENTS

| | | |
|---|---|---|
| CN | 209205604 U | 8/2019 |
| CN | 211217194 U | 8/2020 |
| CN | 212883024 U | 4/2021 |
| CN | 116733078 A | 9/2023 |

* cited by examiner

*Primary Examiner* — Steven M Cernoch
(74) *Attorney, Agent, or Firm* — Nitin Kaushik

(57) ABSTRACT

Provided is a spray gun with convenient and quick water discharge, belonging to the technical field of horticultural irrigation tools, including a water spray gun body, a handle, a water inlet pipe and a nozzle. One end of the water spray gun body is movably connected to one end of the handle, the water spray gun body is fixedly connected to the water inlet pipe, the other end of the water spray gun body is fixedly connected to the nozzle, the water inlet pipe is positioned between the handle and the nozzle, the water spray gun body is internally provided with a control assembly, the control assembly is configured to control water flow in the water inlet pipe, and the control assembly passes through the handle and the water spray gun body and extends to the interior of the water spray gun body.

5 Claims, 2 Drawing Sheets

SPRAY GUN WITH CONVENIENT AND QUICK WATER DISCHARGE

TECHNICAL FIELD

The present disclosure belongs to the technical field of horticultural irrigation tools, and in particular, relates to a spray gun with convenient and quick water discharge.

BACKGROUND

A horticultural spray gun is a device used for horticultural work, usually connected to a faucet or hose, for irrigating plants, cleaning gardens, spraying fertilizers or chemicals, and so on. The spray pattern, spray intensity and spray range are usually adjustable to meet the water demand of different kinds of plants and the requirements of horticultural work. In the process of social development, the emergence and popularization of horticultural spray guns reflect people's concern for horticulture, agriculture and the environment, as well as technological advancements and changes in lifestyles. Prior to the agricultural revolution, people relied mainly on hand watering or natural precipitation to meet the water needs of crops. This approach was inefficient and susceptible to climatic and seasonal constraints, resulting in unstable yields. With the acceleration of urbanization and industrialization, the demand for horticulture in densely populated cities and peri-urban areas has been increasing. The emergence of horticultural spray guns meets the needs of urban residents for landscaping and greening public spaces, and has become an important tool for urban gardeners.

Existing horticultural spray guns usually require fine-tuning to control the water discharge when in use, and fine-tuning the water discharge usually requires the user to rotate and adjust several times, which is relatively cumbersome to operate, especially for unfamiliar or inexperienced users, it may take more time and energy to master the correct operation method. Due to the complex structure of the spray gun with fine-tuning water discharge, the maintenance and cleaning are relatively difficult. Regular cleaning and maintenance are required, otherwise problems such as blockage or water leakage are prone to occur, which affects the use effect.

In conclusion, the existing horticultural spray gun has the problem that the operation is cumbersome and the water cannot be quickly discharged.

SUMMARY

In view of this, the present disclosure provides a spray gun with convenient and quick water discharge, which can solve the problem that the existing horticultural spray gun has cumbersome operation and cannot quickly discharge water.

The present disclosure is implemented in the following way:

The present disclosure provides a spray gun with convenient and quick water discharge, including a water spray gun body, a handle, a water inlet pipe and a nozzle. One end of the water spray gun body is movably connected to one end of the handle, the water spray gun body is fixedly connected to the water inlet pipe, the other end of the water spray gun body is fixedly connected to the nozzle, the water inlet pipe is positioned between the handle and the nozzle, the water spray gun body is internally provided with a control assembly, the control assembly is configured to control water flow in the water inlet pipe, and the control assembly passes through the handle and the water spray gun body and extends to an interior of the water spray gun body.

The spray gun with convenient and quick water discharge provided by the present disclosure has the following technical effects. The water spray gun body can accommodate the internal components and provide durability and stability, and the long-term use and the influence of the external environment can be withstood; the handle provides comfort holding for the user and reduces hand fatigue, thereby increasing the comfort of use; the user can easily carry and move the water spray gun for various cleaning and irrigation tasks; and the nozzle can spray a water flow for irrigation according to the needs of the user, and the water flow can be evenly distributed within the spraying range, avoiding uneven water flow or dead corners. Thus, a more evenly cleaning or irrigation result can be ensured, and the problems of concentration or leakage of the water flow are prevented. The control assembly can directly control the water discharge, which makes the operation of the water discharge simpler, and the user does not need to spend time and energy to adjust the water spray mode or angle; the direct water discharge mode without adjustment means that the user can start the water flow immediately, saving the time of waiting for adjustment, especially suitable for the situation that requires quick cleaning or irrigation, and since there are no adjustable parts, the design of direct water discharge may be more concise and stable, reducing the possibility of damages or failures of the parts, and improving the durability of the product. Due to the simplification of the design and the parts, the design of direct water discharge is economical and low-cost.

On the basis of the above technical solution, the spray gun with convenient and quick water discharge of the present disclosure may also be improved as follows:

The control assembly includes a knob, a vertical baffle plate, a connecting shaft and a stopper, the knob is fixedly connected to one end of the connecting shaft, the connecting shaft passes through the handle and the water spray gun body and extends to the interior of the water spray gun body, the other end of the connecting shaft is fixedly connected to the vertical baffle plate, and the stopper is fixedly connected to a lower part of the vertical baffle plate.

Further, the stopper is located directly above the water outlet of the water inlet pipe, and the stopper is in contact with an inner wall of the water spray gun body.

Further, one end of a bump is fixedly connected to an upper part of the vertical baffle plate, the other end of the bump is in contact with the inner wall of the water spray gun body, and the size of the vertical baffle plate is consistent with the size of a water inlet of the nozzle.

Further, a lever is fixedly connected to the knob, and the knob has a round table-shaped structure.

Further, a surface of the stopper in contact with the inner wall of the water spray gun body has an arc-shaped structure, and the stopper is matched with the inner wall of the water spray gun body.

Further, a surface of the bump in contact with the inner wall of the water spray gun body has an arc-shaped structure, and the bump is matched with the inner wall of the water spray gun body.

Compared with the prior art, the spray gun with convenient and quick water discharge provided the present disclosure has the following beneficial effects. The water spray gun body can accommodate the internal components and provide durability and stability, and the long-term use and the influence of the external environment can be withstood;

the handle provides comfort holding for the user and reduces hand fatigue, thereby increasing the comfort of use; the user can easily carry and move the water spray gun for various cleaning and irrigation tasks; and the nozzle can spray a water flow for irrigation according to the needs of the user, and the water flow can be evenly distributed within the spraying range, avoiding uneven water flow or dead corners. Thus, a more evenly cleaning or irrigation result can be ensured, and the problems of concentration or leakage of the water flow are prevented. The control assembly can directly control the water discharge, which makes the operation of the water discharge simpler, and the user does not need to spend time and energy to adjust the water spray mode or angle; the direct water discharge mode without adjustment means that the user can start the water flow immediately, saving the time of waiting for adjustment, especially suitable for the situation that requires quick cleaning or irrigation, and since there are no adjustable parts, the design of direct water discharge may be more concise and stable, reducing the possibility of damages or failures of the parts, and improving the durability of the product. Due to the simplification of the design and the parts, the design of direct water discharge is economical and low-cost.

BRIEF DESCRIPTION OF DRAWINGS

In order to more clearly illustrate the technical solution of the embodiments of the present disclosure, a brief description will be given below with reference to the accompanying drawings which are used in the description of the embodiments of the present disclosure. It is obvious that the drawings in the description below are only some embodiments of the present disclosure, and that those skilled in the art can obtain other drawings according to these drawings without involving any inventive effort.

In the figures, the parts identified by the reference signs are listed as follows:

10: water spray gun body; 11: handle; 12: water inlet pipe; 13: nozzle; 14: control assembly; 141: knob; 142: vertical baffle plate; 143: connecting shaft; 144: stopper; 15: lever; 16: bump.

DETAILED DESCRIPTION OF THE EMBODIMENTS

In order to make the objects, technical solutions and advantages of the embodiment of the present disclosure clearer, the technical solution of the embodiment of the present disclosure is described clearly and completely below with reference to the drawings in the embodiment of the present disclosure.

Figure 1:
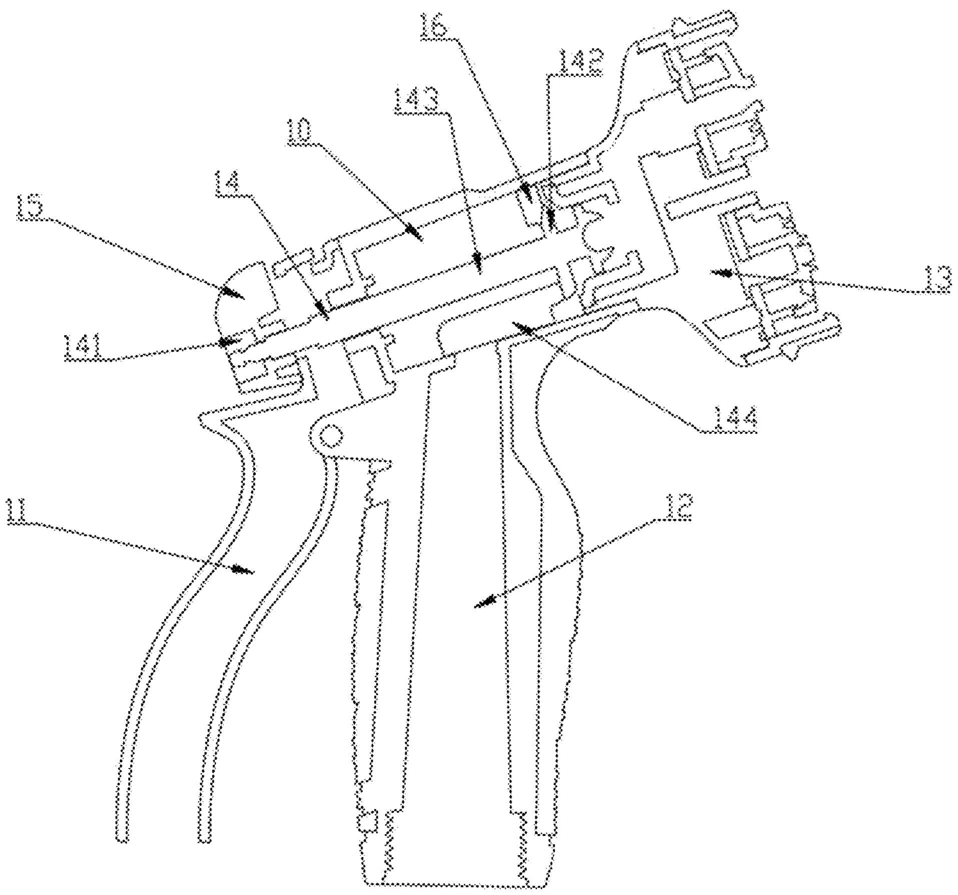
FIG. 1 is a sectional view of a spray gun with convenient and quick water discharge.
Figure 2:
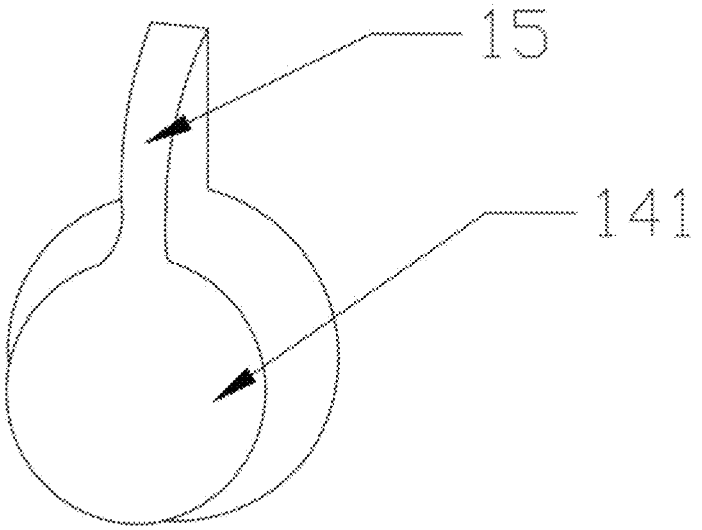
FIG. 2 is a schematic diagram of a knob of a spray gun with convenient and quick water discharge.

As shown in FIG. 1 and FIG. 2, a spray gun with convenient and quick water discharge provided by the present disclosure includes a water spray gun body 10, a handle 11, a water inlet pipe 12 and a nozzle 13. One end of the water spray gun body 10 is movably connected to one end of the handle 11, the water spray gun body 10 is fixedly connected to the water inlet pipe 12, the other end of the water spray gun body 10 is fixedly connected to the nozzle 13, the water inlet pipe 12 is positioned between the handle 11 and the nozzle 13, the water spray gun body 10 is internally provided with a control assembly 14, the control assembly is configured to control water flow in the water inlet pipe 12, and the control assembly 14 passes through the handle 11 and the water spray gun body 10 and extends to an interior of the water spray gun body 10.

When the spray gun with convenient and quick water discharge is used, a water flow stays in the water inlet pipe 12 due to the blocking of the stopper 144, and when the nozzle 13 needs to spray water, a lever 15 is held to rotate a knob 141, the knob 141 drives a connecting shaft 143 to rotate, and the connecting shaft 143 simultaneously drives a vertical baffle plate 142, a stopper 144 and a bump 16 to rotate. As the stopper 144 and the bump 16 rotate tightly against an inner wall of the water spray gun body 10 to expose a water outlet of the water inlet pipe 12, the water flow flows into the water spray gun body 10 from the water inlet pipe 12, and as the vertical baffle plate 142 and a water inlet of the nozzle 13 are consistent in size, water does not flow out of the water spray gun body 10. Then, the handle 11 is moved such that a bottom end of the handle 11 approaches towards the water inlet pipe 12, and as one end of the handle 11 is movably connected to the water spray gun body 10, a top end of the handle 11 moves in a direction away from the water inlet pipe 12, driving the knob 141 to move backward, the knob 141 drives the connecting shaft 143 and the vertical baffle plate 142 to slide inside the water spray gun body 10, and a gap appears between the vertical baffle plate 142 and a water inlet of the nozzle 13, and the water flow flows from the water spray gun body 10 to the nozzle 13 through the gap to be eventually sprayed out.

When the spray gun with convenient and quick water discharge is to be stopped, the handle 11 is released to reset the control assembly 14, and the vertical baffle plate 142 blocks the water inlet of the nozzle 13, by which the water flow of the water spray gun body 10 cannot flow out; the knob 141 is rotated to drive the stopper 144 to rotate and return to position, and the stopper 144 blocks a water outlet of the water inlet pipe 12, and the water in the water inlet pipe 12 cannot enter the water spray gun body 10; and repeatedly moving the handle 11 can drain the water from the spray gun body 10.

In the above technical solution, the control assembly 14 includes the knob 141, the vertical baffle plate 142, the connecting shaft 143 and the stopper 144, the knob 141 is fixedly connected to one end of the connecting shaft 143, the connecting shaft 143 passes through the handle 11 and the water spray gun body 10 and extends to the interior of the water spray gun body 10, the other end of the connecting shaft 143 is fixedly connected to the vertical baffle plate 142, and the stopper 144 is fixedly connected to a lower part of the vertical baffle plate 142.

Further, in the above technical solution, the stopper 144 is located directly above the water outlet of the water inlet pipe 12, and the stopper 144 is in contact with an inner wall of the water spray gun body 10.

Further, in the above technical solution, one end of a bump 16 is fixedly connected to an upper part of the vertical baffle plate 142, the other end of the bump 16 is in contact with the inner wall of the water spray gun body 10, and the size of the vertical baffle plate 142 is consistent with the size of the water inlet of the nozzle 13.

Further, in the above technical solution, the lever 15 is fixedly connected to the knob 141, and the knob 141 has a round table-shaped structure.

Further, in the above technical solution, a surface of the stopper 144 in contact with the inner wall of the water spray gun body 10 has an arc-shaped structure, and the stopper 144 is matched with the inner wall of the water spray gun body 10.

Further, in the above technical solution, a surface of the bump 16 in contact with the inner wall of the water spray gun body 10 has an arc-shaped structure, and the bump 16 is matched with the inner wall of the water spray gun body 10.

Specifically, the principles of the present disclosure are as follows. When the spray gun with convenient and quick water discharge is used, a water flow stays in the water inlet pipe 12 due to the blocking of the stopper 144, and when the nozzle 13 needs to spray water, a lever 15 is held to rotate a knob 141, the knob 141 drives a connecting shaft 143 to rotate, and the connecting shaft 143 simultaneously drives a vertical baffle plate 142, a stopper 144 and a bump 16 to rotate. As the stopper 144 and the bump 16 rotate tightly against an inner wall of the water spray gun body 10 to expose a water outlet of the water inlet pipe 12, the water flow flows into the water spray gun body 10 from the water inlet pipe 12, and as the vertical baffle plate 142 and a water inlet of the nozzle 13 are consistent in size, water does not flow out of the water spray gun body 10. Then, the handle 11 is moved such that a bottom end of the handle 11 approaches towards the water inlet pipe 12, and as one end of the handle 11 is movably connected to the water spray gun body 10, a top end of the handle 11 moves in a direction away from the water inlet pipe 12, driving the knob 141 to move backward, the knob 141 drives the connecting shaft 143 and the vertical baffle plate 142 to slide inside the water spray gun body 10, and a gap appears between the vertical baffle plate 142 and a water inlet of the nozzle 13, and the water flow flows from the water spray gun body 10 to the nozzle 13 through the gap to be eventually sprayed out.

When the spray gun with convenient and quick water discharge is to be stopped, the handle 11 is released to reset the control assembly 14, and the vertical baffle plate 142 blocks the water inlet of the nozzle 13, by which the water flow of the water spray gun body 10 cannot flow out; the knob 141 is rotated to drive the stopper 144 to rotate and return to position, and the stopper 144 blocks a water outlet of the water inlet pipe 12, and the water in the water inlet pipe 12 cannot enter the water spray gun body 10; and repeatedly moving the handle 11 can drain the water from the spray gun body 10.

What is claimed is:

1. A spray gun, comprising a water spray gun body (10), a handle (11), a water inlet pipe (12) and a nozzle (13), wherein one end of the water spray gun body (10) is movably connected to one end of the handle (11), the water spray gun body (10) is fixedly connected to the water inlet pipe (12), the other end of the water spray gun body (10) is fixedly connected to the nozzle (13), the water inlet pipe (12) is positioned between the handle (11) and the nozzle (13), the water spray gun body (10) is internally provided with a control assembly (14), the control assembly (14) is configured to control water flow in the water inlet pipe (12), and the control assembly (14) passes through the handle (11) and the water spray gun body (10) and extends to an interior of the water spray gun body (10);

wherein the control assembly (14) comprises a knob (141), a vertical baffle plate (142), a connecting shaft (143) and a stopper (144), the knob (141) is fixedly connected to one end of the connecting shaft (143), the connecting shaft (143) passes through the handle (11) and the water spray gun body (10) and extends to the interior of the water spray gun body (10), the other end of the connecting shaft (143) is fixedly connected to the vertical baffle plate (142), and the stopper (144) is fixedly connected to a lower part of the vertical baffle plate (142);

wherein the stopper (144) is located directly above a water outlet of the water inlet pipe (12), and the stopper (144) is in contact with an inner wall of the water spray gun body (10); the stopper (144) is configured to block the water outlet of the water inlet pipe (12);

rotation of the knob (141) rotates the connecting shaft (143) and the stopper (144) to expose the water outlet of the water inlet pipe (12);

and movement of the handle (11) relative to the water spray gun body (10) moves the vertical baffle plate (142) to form a gap between the vertical baffle plate (142) and a water inlet of the nozzle (13) such that water flows from the water inlet pipe (12) to the nozzle (13).

2. The spray gun according to claim 1, wherein one end of a bump (16) is fixedly connected to an upper part of the vertical baffle plate (142), the other end of the bump (16) is in contact with the inner wall of the water spray gun body (10), and the size of the vertical baffle plate (142) is consistent with the size of a water inlet of the nozzle (13).

3. The spray gun according to claim 2, wherein a lever (15) is fixedly connected to the knob (141), and the knob (141) has a round table-shaped structure.

4. The spray gun according to claim 3, wherein a surface of the stopper (144) in contact with the inner wall of the water spray gun body (10) has an arc-shaped structure, and the stopper (144) is matched with the inner wall of the water spray gun body (10).

5. The spray gun according to claim 4, wherein a surface of the bump (16) in contact with the inner wall of the water spray gun body (10) has an arc-shaped structure, and the bump (16) is matched with the inner wall of the water spray gun body (10).

* * * * *